Sept. 11, 1962 T. WYATT 3,053,481
TETHER STATION
Original Filed Aug. 29, 1957
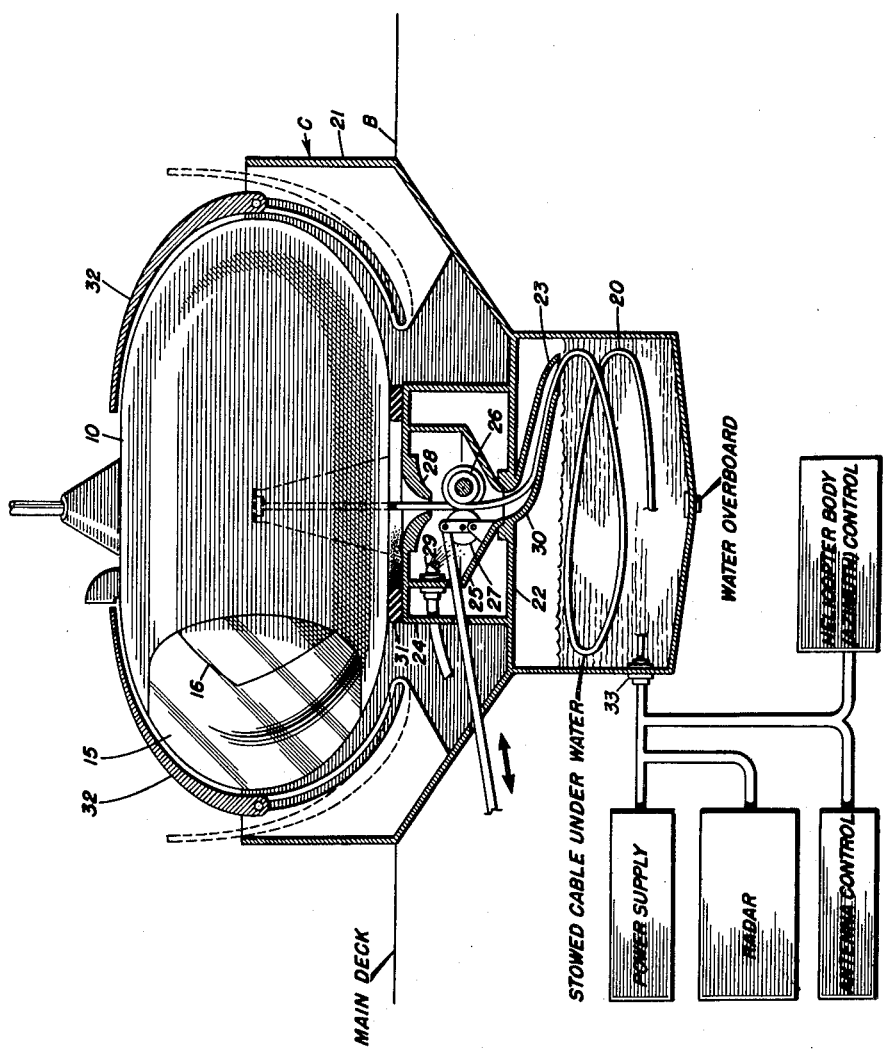
THEODORE WYATT
INVENTOR
BY
ATTORNEYS

United States Patent Office 3,053,481
Patented Sept. 11, 1962

3,053,481
TETHER STATION
Theodore Wyatt, Silver Spring, Md., assignor to the United States of America as represented by the Secretary of the Navy
Original application Aug. 29, 1957, Ser. No. 681,148. Divided and this application Aug. 13, 1959, Ser. No. 833,653
5 Claims. (Cl. 244—17.17)

This invention relates generally to a helicopter tether station; more particularly, it relates to a tether station for a hovering robot helicopter employed as a component of a radar system.

This application is a division of applicant's copending application Serial Number 681,148, filed August 29, 1957, and entitled "Radar System."

It is an object of this invention to provide a robot helicopter tether station having means therein to control the extent of elevation of said helicopter.

A further object of the invention is to provide a robot helicopter tether station having means therein to cool the helicopter power cable.

It is also an object of the present invention to provide a robot helicopter tether staion having means to protect the helicopter when the same is not in actual use.

Other objects and many of the attendant advantages of this invention will be readily appreciated as the same becomes better understood by reference to the following detailed description when considered in connection with the accompanying drawing, wherein:

The FIGURE is a sectional view, partly in elevation, showing a tethered helicopter nested in a tether station constructed according to this invention.

The present invention relates to a helicopter tether station for use with the radar system described in applicant's copending application Serial Number 681,148. Briefly, the radar system described in said copending application contemplates a remotely powered and controlled tethered helicopter which is elevated by a conventional helicopter blade or propeller system driven through a known type transmission. An electric motor, driving through the transmission, provides power for the blades. The helicopter body contains an antenna which is presented toward a radome carried in the wall of the body. The entire body may be rotated with respect to the motor and its transmission, whereby the antenna may be caused to sweep 360°. Portions of the radar transmitter and receiver are carried within the body of the helicopter and other portions or components are positioned in the ground station or on shipboard, connections between the helicopter components and those on the ground or shipboard being maintained through a cable which also serves to tether the helicopter above the ground radar station or ship. It should be understood, however, that some data and control functions can be transmitted up to the helicopter or down to the ground or ship base by the cable or by radio link. The choice can be made to suit the specific design and application.

In order to keep the size of the cable as small as possible so as to minimize the cable aerodynamic forces and to keep the weight of the cable at a minimum, the current passed through the conductors thereof is higher than usual practice dictates, causing said cable to operate at a temperature just safely below the limit of high temperature insulating materials. The elevated temperature of the cable precludes ice formation, but, as discussed below, requires the provision of cooling means when it is confined or stored in a manner preventing atmospheric cooling.

Referring to the drawing, a tether station constructed according to the present invention is shown in the figure. The tether station shown is a shipboard installation, the deck of the ship being designated at B, the helicopter at 10, and the station generally at C. The helicopter 10 carries a radome 15 in its side wall. Within the helicopter and confronting the radome is a radar antenna 16. The tether station C is best located in a cleared area, such as on the fantail of the ship, and includes a circular receptacle 21 comprising a side wall which has a straight upper portion, an inclined lower portion and a bottom wall 22. Positioned below the bottom wall 22 is a cable stowage tank 23. Above the wall 22 there is located a housing 24 which encases a chamber 25 enclosing a powered capstan 26 and idler 27, a funnel-shaped cable opening 28, commonly referred to as a hawse, being positioned in the top wall of the housing 24. Power for the capstan 26 may be supplied by a motor (not shown). An inlet nozzle 29, connected to a source of water, is mounted on the side wall of the chamber 25 and extends through the side wall of the housing 24. Water flow is provided for cooling the cable 20, which would otherwise become overheated in the tank 23. An alternative design might incorporate a conventional cable drum and water sprays. For leading the cable 20 into the tank 23 there is provided a guide tube 30. A shock absorber ring 31 overlies the top wall of the housing 24 for cushioning the helicopter when in position in the tether station C. "Clam shell" doors 32 are mounted on the side wall of the receptacle 21 and are movable in slots from the broken line positons to the positions shown in full lines, for protecting the helicopter body when in tethered position from heavy seas or from accidental blows from other objects on the ship.

With the helicopter in tethered position the cable 20 extends through the hawse 28, about the powered capstan 26, through the guide tube 30 and into the stowage tank 23. An end portion of the cable is passed through a suitable gland 33 in the side wall of the tank and connected to a power source (not shown) and to shipborne radar components. By the use of capstan 26, the tank 23 and associated structure, it is possible to insure proper cooling and storage of the cable 20 to prevent failure thereof from excessive temperatures. Moreover, the cable stowage arrangement eliminates the use of slip rings for transferring power at the tether station, and no level wind mechanism, which would be required with a winch drum, is needed. The idler 27 is adjustable and is employed as a constant tension brake for maintaining the cable 20 under a desired amount of tension at all times.

In operation, prior to elevation of the helicopter from the tether station C, assuming shipboard operation, the "clam shell" doors 32 are retracted and the helicopter 10 is prepared for flight. Power is then applied, through the cable 20, to the motor of the helicopter for rotating its blades. After the motor has been brought up to speed the helicopter will exert full lift on the cable 20, against the restraining effort exerted by the idler 27 under control of the operating personnel. As the restraint is released the helicopter will rise above the ship at a rate under the control of the operating personnel, and as sufficient cable is payed out to permit its altitude to increase, the helicopter will cease to respond to any ship motion and will assume a steady altitude. The helicopter will continue to climb until the cable is braked at the capstan at the desired altitude, say 1,000 or 2,500 feet. During elevation of the helicopter the radar equipment therein and on the ship would be placed in operation.

Landing of the helicopter may be accomplished by applying power to the capstan and winding in the cable 20 while maintaining said helicopter under full power and stabilization. When fully lowered the helicopter will rest on the shock absorber ring 31, when the blades may be braked to a stop and the power disconnected.

While the tether station of the instant invention is herein described in association with a ship it is obvious that, as stated hereinabove, the same is also capable of installation and use in other environments, such as on land.

Obviously many modifications and variations of the present invention are possible in the light of the above teachings. It is therefore to be understood that within the scope of the appended claims the invention may be practiced otherwise than as specifically described.

What is claimed is:

1. A helicopter tether station including a receptacle adapted to receive a tethered helicopter, a housing attached to and in communication with said receptacle and containing a powered capstan and an idler, said capstan being fixedly mounted within said housing and said idler being movably mounted within said housing and disposed in opposition to said capstan, whereby said capstan and said idler will cooperate to alternately pay out and wind in a cable, a cable stowage tank attached to and in communication with said housing, and nozzle means disposed within said housing and adapted to spray cooling fluid over that portion of a cable that may be disposed within said housing and said stowage tank.

2. A helicopter tether station as recited in claim 1, including a ring of shock-absorbing material disposed within said receptacle and adapted to absorb shock between said helicopter and said receptacle.

3. A helicopter tether station as recited in claim 1, including "clam shell" doors associated with said receptacle and movable to enclose and protect a tethered helicopter disposed therein.

4. A helicopter tether station including, in combination; a receptacle adapted to receive a tethered helicopter; a housing disposed centrally of and attached to said receptacle, a cable stowage tank disposed below and attached to said housing, said housing being placed in communication with said receptacle by a first opening disposed centrally in the top of said housing and with said tank by a second opening disposed in the bottom of said housing, a powered capstan fixed within said housing, an idler disposed within and attached to said housing and movable toward and away from engagement with said capstan, a cable, one end of said cable being attachable to a helicopter and the other end of the cable passing through said first opening, around said powered capstan, through said second opening, and into said tank, said capstan and said idler cooperating to alternately pay out and wind in said cable, and means including a nozzle disposed within said housing for cooling that portion of said cable disposed within said housing and said tank.

5. A helicopter tether station as recited in claim 4, wherein said first opening is a hawse, and including a guide tube disposed within said tank in communication with said second opening for guiding said cable into said tank.

References Cited in the file of this patent

UNITED STATES PATENTS

| 803,573 | Eubank | Nov. 7, 1905 |
| 2,429,502 | Young | Oct. 21, 1947 |
| 2,840,627 | Lewis | June 24, 1958 |

FOREIGN PATENTS

| 447,824 | France | Nov. 8, 1912 |